No. 854,304. PATENTED MAY 21, 1907.
C. OSKAMP.
AUTOMATIC PIE TRIMMING AND CRIMPING MACHINE.
APPLICATION FILED JULY 24, 1905.

2 SHEETS—SHEET 1.

Witnesses
C. M. Fahnestock
Joseph R. Rohrer

Inventor
Clemens Oskamp
by Stem Heidman & Mehlhof
Attorneys

No. 854,304. PATENTED MAY 21, 1907.
C. OSKAMP.
AUTOMATIC PIE TRIMMING AND CRIMPING MACHINE.
APPLICATION FILED JULY 24, 1905.

2 SHEETS—SHEET 2.

Witnesses
C. M. Fahnestock
Joseph R. Rohrer

Inventor
Clement Oskamp
by Stem Heidman & Mehllor
Attorneys

UNITED STATES PATENT OFFICE.

CLEMENS OSKAMP, OF CINCINNATI, OHIO.

AUTOMATIC PIE TRIMMING AND CRIMPING MACHINE.

No. 854,304.　　　　Specification of Letters Patent.　　　Patented May 21, 1907.

Application filed July 24, 1905. Serial No. 270,991.

*To all whom it may concern:*

Be it known that I, CLEMENS OSKAMP, a citizen of the United States, and a resident of Cincinnati, in the county of Hamilton and State of Ohio, have invented a certain new and useful Improvement in Automatic Pie Trimming and Crimping Machines, of which the following is a full, clear, and exact description, reference being had to the accompanying drawings, which form a part of my specification.

My invention relates to a machine for trimming and crimping pies.

As is well known, in the operation of making pies, the lower and upper crusts (or the lower alone, when only one crust is used), are made roughly to fit the pie-plate. It is then usual to trim the edge of these crusts by hand in various ways. This process, however, is slow and tedious, and it is necessary in large baking establishments, to employ three or four operatives for this alone. The result is not satisfactory, for the reason that the dough is apt to be crowded or bunched together at various places around the periphery of the pie. In addition, the crimping of the pie requires another and separate operation.

The object of my invention is to produce a machine which will automatically crimp and trim the edge of the pie at one operation.

The advantages of my machine not only lie in its automatic character, and the rapidity with which pies may be trimmed and crimped, but also in the fact that by reason of its peculiar operation, the crusts are trimmed evenly without any bunching or thickening of the dough, as in hand trimming. Crusts may be rolled much thinner than would be possible in the case of hand trimmed pies. These advantages will appear more clearly as I proceed with my specification.

Figure 1:
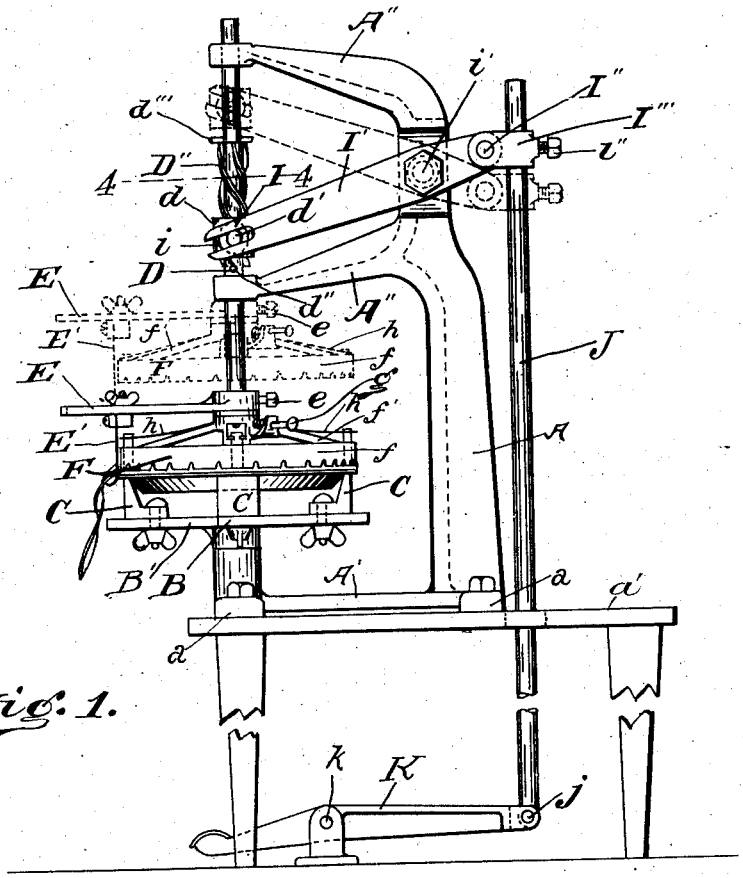
Figure 2:
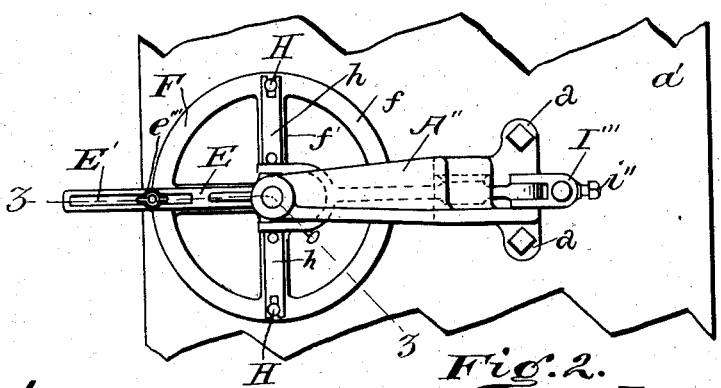
Figure 3:
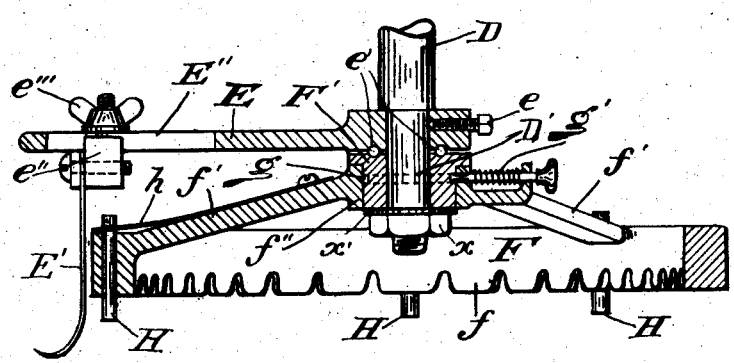
Figure 4:
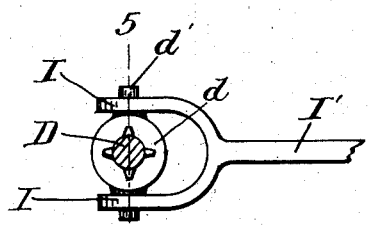
Figure 5:
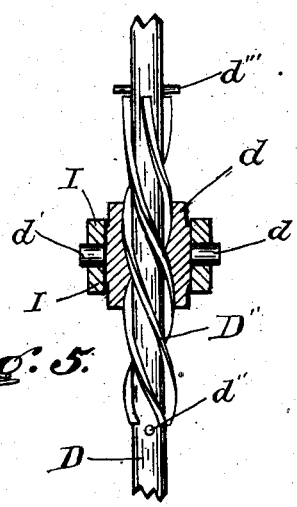
Figure 6:
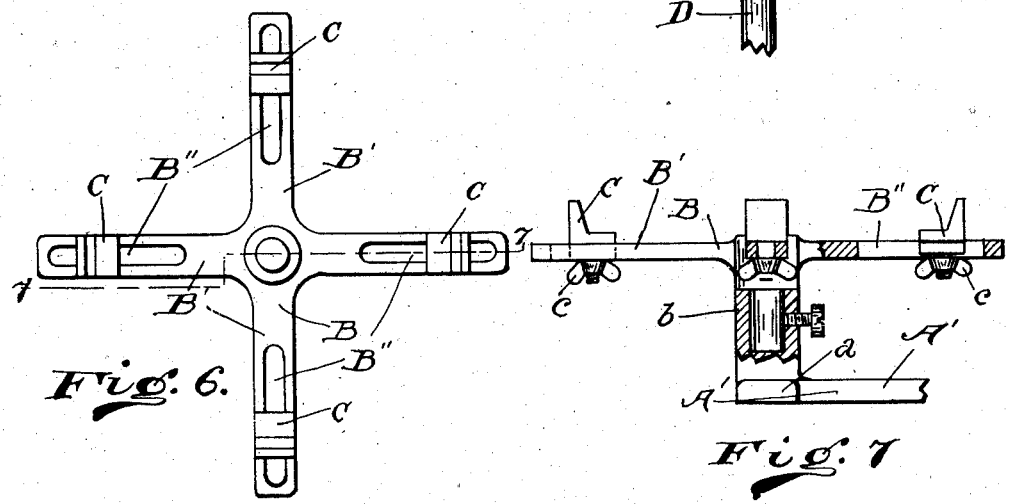
Figure 7:
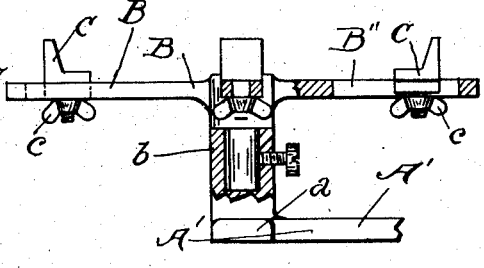

In the drawings:—Figure 1 represents a side elevation of my improved machine; Fig. 2 is a top plan view of the same; Fig. 3 is a vertical section on an enlarged scale through the crimping and trimming tool of the machine, on the line 3—3 of Fig. 2; Fig. 4 is a horizontal section on an enlarged scale through the operating screw and nut, on the line 4—4 of Fig. 1; Fig. 5 is a vertical section on the line 5—5 of Fig. 4; Fig. 6 is a top plan view of the pie plate support on an enlarged scale, and Fig. 7 is a vertical section through the same, on the line 7—7.

My improved machine comprises essentially a support for the pie-plate, a device which engages the edge of the pie, and holds it during the operation of the trimming mechanism, and at the same time crimps it, a knife adapted to pass around the edge of the pie and trim it, and a releasing attachment which insures the release of the pie when the crimping and holding device is removed from contact with it. These parts are arranged so that a single movement by the operator will bring them all into proper and co-operative action. The several parts are preferably made adjustable so as to accommodate pies of various sizes.

In the drawings, A is a standard by means of which the several parts are supported and guided in their operation. Said standard is provided with a base A′ having lugs $a$ for securing it to a table or bench $a'$ which is at proper elevation to suit the convenience of the operator. The supporting frame for the pie-plate is represented at B and is secured in any convenient manner (see Fig. 7) in an upwardly projecting socketed boss $b$ on the base A′. This supporting frame has preferably four radially projecting arms B′ provided with slots B″. Angular lugs C are adjustably secured in these slots by means of fly-headed set-screws $c$ and are adapted, upon proper adjustment, to support the edges of pie-plates of various diameters. The lugs C are preferably of greater height than the depth of a pie-plate, so that the pie-plate is supported at its flange on the upper edges of said lugs only. This permits the pie-plate to be dropped into place, and insures its proper location without special care on the part of the operator of the machine.

D is a vertical shaft which supports and operates the crimping device and also the rotary trimming blade. Said shaft is loosely journaled in arms A″, A″, projecting from the standard A.

E is the trimming blade arm, E′, the trimming blade, and F the crimping device, which bears down upon the edge of the pie to crimp it, and at the same time holds the pie, and particularly the edge thereof, during the operation of the blade E′. The shaft D is turned down at D′ (as clearly seen in Fig. 3), and has secured to it at this point the arm E and a supplemental hub F′ to which the crimping device F is secured, as will be described later. The arm E and the hub F′ are supported in place by means of a nut $x$ and washer $x'$, and the arm E is secured to the portion D' of the shaft D by means of a setscrew $e$. Ball bearings are made on the adjacent surfaces of the supplemental hub F' and the arm E, in which are placed the balls $e'$. The end of the arm E is provided with a slot E'' in which is supported the blade-carrying-block $e''$, which is adjustably secured at various points in the slot by means of the flynut $e'''$. This arrangement permits the blade E' to be located at various distances from the center of the shaft D to accommodate pies of various sizes.

The crimping device F comprises a crimping ring $f$, radial arms $f'$ and a hub $f'''$, all of the parts being preferably formed integral. The hub $f'''$ is supported on the supplemental hub F' and is adapted to be secured thereto by means of an annular groove $g$ in the hub F' and a spring-controlled pin $g'$ secured to a casting attached to the radial arms $f'$ and projecting through the hub $f'''$ into the groove $g$. The crimping device F has to be changed in order to accommodate pies of different sizes, and its attachment as just described permits of its ready removal and replacement. The lower edge of the crimping ring is fluted and is adapted to engage the edge of the pie and hold the pie against rotation while at the same time crimping it. To insure the withdrawal of the crimping device F without the crimping edges sticking to the dough of the pie, I provide at several points around the periphery of the crimping ring, vertically movable pins H supported by flat springs $h$ secured to the radial arms of the crimper. These flat springs normally tend to hold the releasing pins H much below the lower surface of the crimping ring, so that when the crimping ring is brought into engagement with the edge of the pie, the releasing pins come into engagement with the edge of the pie-plate itself, under pressure, with the result that when the crimping ring is withdrawn, the pressure of the releasing pins forces the pie away from the crimping ring and thus prevents the latter from sticking to the dough of the pie.

The shaft D is provided with a threaded portion D'', and upon this threaded portion is fitted a nut $d$ having laterally projecting trunnions $d'$. The trunnions $d'$ have bearing in slots $i$ in the bifurcations I of an arm I' pivoted at $i'$ to the standard A. The threaded portion D'' is of sufficient extent to cause, upon the raising or lowering of the nut $d$, one and a quarter revolution of the shaft. The pivoted arm I' is operated by a rod J back of the standard which passes down through the table $a'$ below which it is pivoted at $j$ to a treadle-lever K pivoted at $k$ to the floor in any convenient manner. The arm I' is pivoted at I'' to a socketed lug I''' which is secured by a set-screw $i''$ to the rod J. This permits of the vertical adjustment of the connection between arm I' and the rod J in order to accommodate tables or benches of different heights.

The operation of my improved machine as thus far described is as follows:—When the arm I', the trimming knife E', and the crimper F are up, as indicated in dotted lines in Fig. 1, which position they naturally assume from the weight of the rod J and the treadle-lever K, a pie in a pie-plate is placed on the supporting device B with the edge of the pie-plate supported by the angular lugs C. The operator then places his foot on the treadle K' thereby raising the rod J, and with it the short end of the arm I', which forces the other end of said arm downward. This downward movement of the arm I' carries with it the nut $d$, the shaft D, the blade-carrying arm E, and the crimping device F,— the movement continuing until the fluted edge of the crimper is brought into contact with the edge of the pie. This movement continues until the resistance of the dough overcomes the resistance of the friction of the thread D'' to the rotation of the nut $d$, when the further movement of the arm I' and with it the nut $d$ causes said shaft D to rotate. The rotation of the shaft D causes the knife carrying arm E to rotate, and the knife itself to pass completely around the edge of the pie-plate, in engagement therewith, so as to trim off the edge of the pie crust or crusts, which project beyond the plate. This rotation is continued until the nut $d$ reaches a pin $d''$ located at the bottom of the thread. By engaging said pin, the shaft D is forced down so as to insure thorough contact of the crimping ring F with the edge of the pie, and a resultant definite and deep crimp. The foot of the operator is then withdrawn from the treadle, whereupon the weight of the rod J and the pedal-lever K raise the nut $d$ up, thus rotating the shaft D back to its original position, until the nut strikes a pin $d'''$ located at the upper end of the thread D'', when the crimper and trimming mechanism are lifted entirely clear of the pie, and back into the position indicated in dotted lines.

The blade E' is made thin and springy, and its lower end curved or hooked as indicated in the drawings, so as to insure its always bearing against the rim of the pie-plate, and also to insure its clearing the pie-plate edge as it is brought into operative position. The releasing pins H as before described, push the pie from the crimper as the crimper is raised, thereby preventing the pie dough from sticking to the crimper.

I do not wish to limit myself to the details of construction illustrated in the drawing and described in the specification, as it is apparent that these may be varied without departing from the spirit of my invention.

What I desire to claim as new and to cover by Letters Patent, is:—

1. A pie trimming machine comprising a supporting member adapted to support the pie-plate, a rotary and vertically shiftable shaft centrally located above said supporting member, a holding member loosely carried at the lower end of said shaft adapted to engage the pie, an arm secured to said shaft, and a depending spring-blade secured to said arm adapted to engage the edge of the pie-plate when said shaft is shifted toward said supporting member, together with mechanism to produce co-operative movement of the parts.

2. A pie trimming and crimping machine comprising a supporting member adapted to support the pie-plate, a rotary and vertically shiftable shaft centrally located above said supporting member, a holding and crimping member loosely carried at the lower end of said shaft adapted to engage the pie, an arm secured to said shaft, and a depending spring-blade secured to said arm adapted to engage the edge of the pie-plate when said shaft is shifted toward said supporting member, together with mechanism to produce co-operative movement of the parts.

3. A pie trimming machine, comprising a supporting member adjustable in diameter, a removable holding member adapted to engage the edge of the pie, a rotary trimming blade adjustably supported to accommodate pies of various diameters said blade extending at substantially a right angle to the plane of the pie and adapted to pass around the pie in engagement with the edge of the pie plate and mechanism adapted to produce the co-operative movement of the said parts.

4. A pie trimming machine, comprising a supporting member, a holding member adapted to engage the edge of the pie, spring controlled movable pins carried by said holding member projecting in advance of it, a rotary and endwise shiftable shaft to which said holding member is loosely secured, an arm secured to said shaft, a spring-blade attached to said arm adapted to pass around the pie in engagement with the edge of the pie-plate, and mechanism to produce the co-operative movement of the parts.

5. A pie crimping and trimming machine comprising a supporting member, a crimping and holding member adapted to engage the edge of the pie, spring-controlled movable pins carried by said crimping and holding member projecting in advance of it, a rotary and endwise shiftable shaft to which said crimping and holding member is loosely secured, an arm secured to said shaft, a spring-blade attached to said arm adapted to pass around the pie in engagement with the edge of the pie-plate, and mechanism to produce the co-operative movement of the parts.

6. A pie trimming and crimping machine, comprising a supporting member adjustable in diameter, a removable holding and crimping member adapted to engage the edge of the pie, a rotary trimming blade adjustably supported to accommodate pies of various diameters, said blade being substantially at right angles to the plane of the pie and adapted to pass around the pie in engagement with the edge of the pie plate and mechanism adapted to produce the co-operative movement of the said parts.

7. A pie trimming machine, comprising a standard, a supporting member secured to said standard having lugs adjustably secured thereto adapted to support the edge of the pie-plate, a vertically shiftable and rotary shaft supported centrally above said supporting member, a holding member removably and loosely secured at the end of said shaft adapted to engage the edge of said pie, a blade carrying arm secured to said shaft, and rotating therewith, a depending spring blade adjustably secured to said arm adapted to engage the edge of the pie-plate, and mechanism to produce co-operative movement of the said parts.

8. A pie trimming and crimping machine, comprising a standard, a supporting member secured to said standard having lugs adjustably secured thereto, adapted to support the edge of the pie-plate, a vertically shiftable and rotary shaft supported centrally above said supporting member by said standard, a holding and crimping member removably and loosely secured at the end of said shaft adapted to engage the edge of said pie, a blade carrying arm secured to said shaft and rotating therewith, a depending spring blade adjustably secured to said arm adapted to engage the edge of the pie-plate, and mechanism to produce the co-operative movement of the said parts.

9. In a pie trimming and crimping machine, in combination with a supporting member, a crimping member having a ring of the diameter of the pie, the face of said ring above the pie being fluted and adapted to engage the edge of the pie, a spring-blade at right angles to the plane of the pie, adapted to pass around the pie in engagement with the edge of the pie plate, together with mechanism to produce co-operative action of said parts.

10. In a pie trimming and crimping machine, in combination with a supporting member, a rotary, endwise shiftable shaft supported centrally above said supporting member, a crimping-member loosely secured to the end of the said shaft above said supporting member, an arm rigidly secured to said shaft above said crimping member, and a spring-blade secured to said arm and adapted to be operated by said shaft.

11. In a pie trimming and crimping machine, in combination with a supporting member, a rotary, endwise shiftable shaft supported centrally above said supporting member, a crimping member loosely and removably secured to the end of said shaft above said supporting member, an arm rigidly secured to said shaft above said crimping member, a spring-blade adjustably secured to said arm, and mechanism adapted to produce co-operative movement of the parts.

12. In a pie trimming and crimping machine, in combination with a supporting member, a rotary, endwise shiftable shaft supported centrally above said supporting member, a removable crimping member loosely secured at the end of said shaft, movable spring-controlled pins carried by said crimping-member projecting in advance of the same, and a trimming-blade operated by said shaft and adjustable in its distance from the center thereof, together with mechanism to produce co-operative movement of the parts.

13. In a pie trimming and crimping machine, a supporting-member a rotary, endwise shiftable shaft supported centrally above said supporting-member, a crimping-member loosely secured at the end of said shaft, a trimming-blade adapted to be rotated and brought in position by said shaft, an arm, an operating pedal, a link connecting said arm and operating pedal adjustable in length, and mechanism intermediate said arm and said shaft adapted to rotate and depress said shaft upon the operation of said pedal.

14. In a pie trimming machine, in combination with a supporting-member, an endwise shiftable and rotary shaft located centrally above said supporting member, a holding and crimping-member loosely secured to the end of said shaft, a blade-carrying-arm rigidly secured to said shaft above said crimping member, and a spring-blade hooked or curved outward at its lower end, together with means for producing co-operative movement of the parts.

15. In a pie trimming and crimping machine, in combination, a supporting-member having radial slotted arms and angular lugs adjustably secured in said slots, a rotary, endwise shiftable shaft centrally located above said supporting-member, and a removable holding and crimping-member loosely secured at the end of said shaft, spring-controlled movable pins carried by said holding and crimping member projecting in advance thereof, a slotted arm rigidly secured to said shaft above said holding and crimping member, a spring-blade curved or hooked outward at its lower end adjustably secured in the slot of said arm, and mechanism adapted to depress and rotate said shaft.

CLEMENS OSKAMP.

Witnesses:
CLARENCE E. MEHLHOPE,
JOSEPH R. ROHRER.